Aug. 29, 1961     H. ALBERT ET AL     2,998,395
METHOD FOR RECLAIMING SCRAP POLYURETHANE RESIN
Filed Nov. 28, 1955
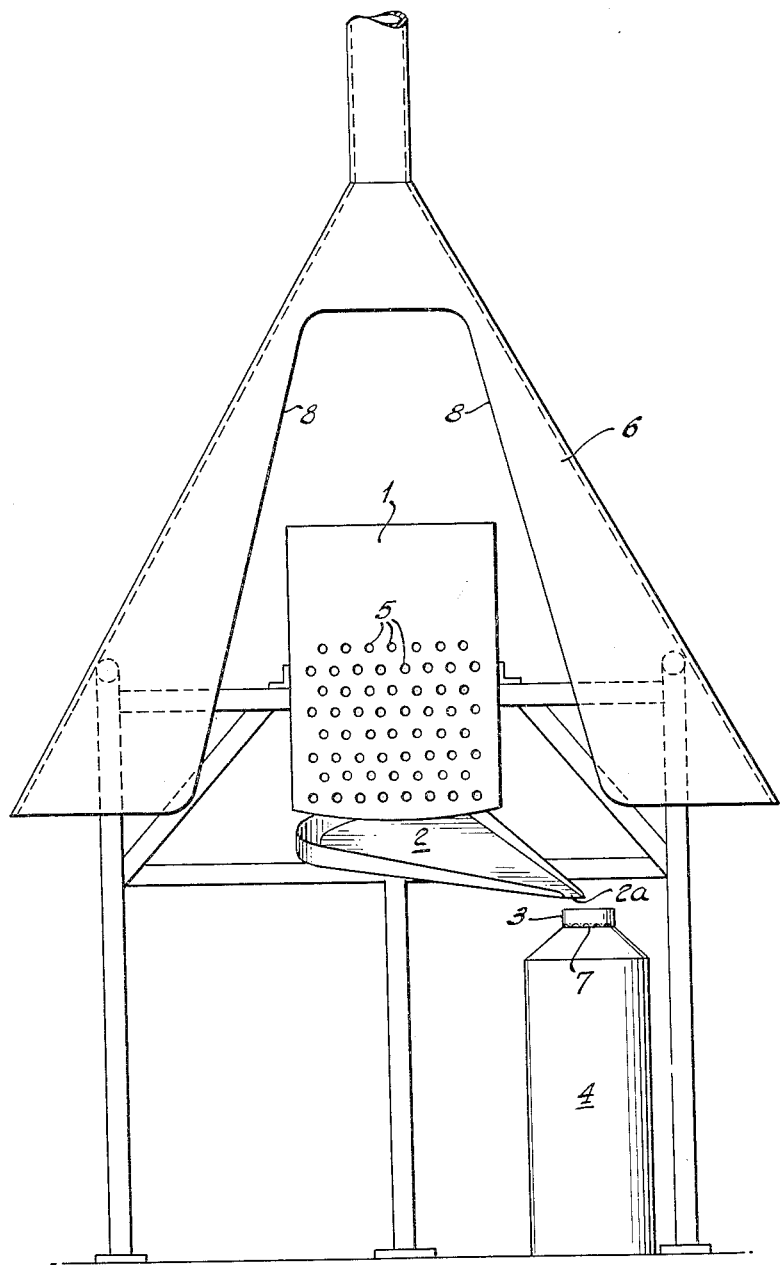

United States Patent Office 2,998,395
Patented Aug. 29, 1961

2,998,395
METHOD FOR RECLAIMING SCRAP POLYURETHANE RESIN
Heinz Albert, Mennighuffen over Lohne, and Wilfried Tacke, Obernbeck over Lohne, Germany, assignors, by mesne assignments, to Reeves Brothers, Inc., New York, N.Y., a corporation of New York
Filed Nov. 28, 1955, Ser. No. 549,500
Claims priority, application Germany Nov. 30, 1954
2 Claims. (Cl. 260—2.3)

This invention relates to polyurethane type resins and is particularly directed to the reclaiming and utilization of waste and scrap resulting from the fabrication of polyurethane resin foam.

Polyurethane resins are prepared from polyesters and poly-isocyanates. Suitable polyesters are esters of polybasic alcohols with polycarboxylic acids, for instance adipic acid. Mixtures of different polyesters may also be used. Such esters are generally reacted with diisocyanates to form polyurethane resins. If the reaction is carried out in the presence of an activating mixture, which includes water or an equivalent agent for hydrolyzing the diisocyanate, the accompanying evolution of carbon dioxide makes the mixture self-foaming so that the resulting resin block has a foam-like or cellular structure. In addition to water, such activating mixture includes generally an accelerator such as an amine, an emulsifying agent such as a sulphonated oil and an agent such as paraffin oil for regulating the pore size in the resin foam. The polyurethane foam preparation is described, for instance, in "Angewandte Chemie," vol. 59, pp. 257–288, particularly pp. 267–8, and in "Modern Plastics Encyclopedia," 1955, pages 145–147. In accordance with present conventional practice about 100 parts of polyester are reacted with about 25 to 50 parts of diisocyanate in the presence of 5 to 15 parts of an activating mixture. The density of the resulting resin foam block decreases with increase in the percentage of the diisocyanate used.

In the conventional production of such foam blocks there is substantial waste at the beginning and end of a run. Thus, at the beginning of a run, the speeds of the various feed pumps must be adjusted and samples taken so that resin foam of the desired cellular structure is obtained. Such samples are scrapped. The mixing chamber is then purged with polyester, thereby adding to the waste or scrap material. At the end of a run, as the various feed pumps are being shut down, the material delivered is not a proper mixture and further adds to the scrap or waste. In addition, as formed, the foam blocks have a leathery surface which is cut off and discarded as scrap. Scrap or waste may also result from cutting the foam blocks into desired shapes. All such unused first and last run resin material and the material cut from the foam blocks and discarded is hereinafter termed "scrap" material.

In the production of polyurethane foam resins about 20 to 30 percent of the starting material may end up as scrap. The primary object of the invention comprises the provision of a novel method for reclaiming and utilizing said scrap material.

It has been found that on burning said scrap resin material in air the polyurethanes are decomposed, whereby the polyesters are split off and may be recovered in the form of a liquid. It has also been found that this recovered liquid can be mixed with fresh polyester and the mixture re-used for the production of resin foam. As herein used the term "fresh polyester" means a polyester which has not previously been used to produce a resin.

The reclaiming process is conveniently carried out by igniting the scrap resin foam in a vessel having a perforated bottom and side walls. As the resin foam burns, a liquid consisting essentially of the polyesters in said resin drains through the perforations of the vessel and is collected. In this way, substantially all of the polyesters in said scrap resin are recovered for re-use.

Other objects of the invention will become apparent upon reading the annexed detailed description in connection with the drawing which shows by way of example an apparatus suitable for recovering polyesters from polyurethane resin scrap.

Referring to the drawing, an open container or vessel 1 is disposed under a hood 6, said hood being provided to carry off combustion gases. The side walls of the vessel 1 are perforated with holes 5 and the bottom of said vessel is also perforated with such holes.

A slightly inclined collecting tray 2 is disposed below the vessel 1 so that liquid draining through the holes in said vessel drops into said tray and flows along said tray and thence through a nozzle 2a into a can 4. A screen 7, for example of fine mesh brass fabric, is placed over the opening 3 into the can 4 to prevent solid particles from entering the can.

The hood 6 has an opening 8 to permit the vessel 1 to be charged with scrap resin. After the scrap resin is placed in the vessel 1 it is ignited, for example simply with a match. The scrap burns with an open flame and with only a small amount of smoke. As the scrap burns, liquid polyester is formed, said liquid drops through the holes 5 of the vessel 1 into the tray 2 from which it drains into the can 4. In this way, substantially all the polyester in the scrap is recovered and collected in the can 4.

As the recovered polyester is inflammable, it is cooled on its travel from the vessel 1 to the can 4 below its ignition point, in order to extinguish any flame on said travel and to prevent leaping over of the flame from the vessel into the can. The cooling is simply accomplished by providing a sufficiently large surface and length of travel; the only conditions are that the liquid on arriving at the nozzle 2a of the tray must have a temperature below the ignition point but at which it is sill sufficiently fluid to maintain a steady uninterrupted flow.

*Example*

30 kg. per hour of polyurethane foam scrap, wherein the polyurethane proper contained about 66% by weight of polyester, were charged into a vessel 1 having a height of 70 cm., a diameter of 50 cm., which was provided with holes of about 15 mm. diameter. The scrap was ignited, for instance by a match and liquid polyester dropped through the holes 5 into the tray 2 and flowed into the can 4. The tray was arranged about 25 cm. below the vessel 1 and had a length of about 110 cm., in order to cool the liquid below its ignition point before entering the can 4. The yield was about 20 kg. liquid per hour; this means that substantially the entire polyester content of the initial charge was recovered.

If the tray is, for instance, approached to the vessel 1 to a distance of only 10 cm., or if the length of the tray is reduced to 60 cm., the liquid may still burn when arriving at the can 4; this is undesirable and would seriously impede the recovery of the liquid.

The liquid polyester thus recovered is dark colored as compared to the fresh polyester. Nevertheless, this recovered polyester liquid can be mixed with fresh polyester to replace a portion of the fresh polyester which would otherwise be used in the production of polyurethane resin foam. The polyester liquid thus recovered is mixed with fresh polyester, preferably while still hot, to insure a homogeneous mixture of the recovered liquid with the fresh. After it has cooled, the polyester mixture is reacted, in substantially the same proportions as when 100% fresh polyester is used, with a diisocyanate in the presence of an activating mixture to produce a polyurethane resin foam in the same way as when a 100% fresh polyester is used. As much as ½ the polyester mixture used may be polyester liquid recovered from said resin scrap as described, the balance being fresh polyester. For economic considerations, at least about 10 percent of the fresh polyester will generally be replaced by the recovered product. The resin foam produced in this manner with the recovered polyester liquid is quite comparable with resin foam prepared with 100% fresh polyesters.

As compared to when 100% fresh polyester is used in producing polyurethane foam, when some of the fresh polyester is replaced with recovered polyester liquid the activating agent preferably contains a smaller percentage of the accelerator and a larger percentage of the pore size regulator. The percentage change in these constituents of the activating agent depends on how much recovered polyester liquid is used. For example, for producing substantially the same resin foam, if ⅓ of the fresh polyester is replaced with recovered liquid polyester then the activating agent may be changed so that it contains 30 to 40% less of its accelerator and about three times more of the agent for regulating pore size.

The cost of recovering the polyesters in the scrap material in the manner described is small compared to the cost of the fresh polyester it replaces whereby a substantial saving is effected, particularly where the scrap has little or no commercial value.

While we have described our invention in detail in its present preferred embodiment, it will be obvious to those skilled in the art, after understanding our invention that various changes and modifications may be made therein without departing from the spirit or scope thereof. We aim in the appended claims to cover all such modifications.

We claim as our invention:

1. A method of decomposing a polyurethane resin with the production of a useful liquid residue which comprises igniting and burning in air a combustible, cellular polyurethane resin being the reaction product of a polyester, a diisocyanate and water, said polyester being the reaction product of a polycarboxylic acid and a polybasic alcohol, thus forming a burning liquid product, cooling said liquid product until the flame is extinguished, and collecting the liquid resdue.

2. A method of decomposing a polyurethane resin with the production of a useful liquid residue, said residue being useful as a polyester additive in the manufacture of polyurethane resins, that comprises igniting and burning a combustible, polyurethane resin, being the reaction product of a polyester, said polyester being the reaction product of a polycarboxylic acid and a polybasic alcohol, and a diisocyanate, allowing the liquid residue of combustion to cool in the air until the flame is extinguished, and gathering the liquid residue.

References Cited in the file of this patent

UNITED STATES PATENTS

| | | |
|---|---|---|
| 2,543,530 | Kropa et al. | Feb. 27, 1951 |
| 2,729,618 | Muller et al. | Jan. 3, 1956 |

OTHER REFERENCES

Polyurethane, Modern Plastics, November 1954, pages 106–107.

Grassie, "Chemistry of High Polymer Degradation Processes," Butterworths Publications, pages 144–148, 1955.